(12) United States Patent
Rhee et al.

(10) Patent No.: US 7,948,908 B2
(45) Date of Patent: May 24, 2011

(54) APPARATUS AND METHOD FOR ENCODING AND DECODING IN A MOBILE COMMUNICATION SYSTEM

(75) Inventors: Jong-Hun Rhee, Suwon-si (KR);
Beom-Sik Bae, Suwon-si (KR);
Min-Goo Kim, Yongin-si (KR);
Jong-Han Lim, Seongnam-si (KR);
Jung-Soo Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1478 days.

(21) Appl. No.: 11/368,663

(22) Filed: Mar. 7, 2006

(65) Prior Publication Data
US 2006/0240773 A1    Oct. 26, 2006

(30) Foreign Application Priority Data

Mar. 7, 2005   (KR) .................... 10-2005-0018884

(51) Int. Cl.
*G01R 31/08* (2006.01)
(52) U.S. Cl. ......... 370/252; 370/335; 370/342; 370/337
(58) Field of Classification Search ................ None
See application file for complete search history.

(56) References Cited

U.S. PATENT DOCUMENTS

| | | | |
|---|---|---|---|
| 2005/0075107 A1* | 4/2005 | Wang et al. | 455/435.1 |
| 2005/0282571 A1* | 12/2005 | Oprescu-Surcobe et al. | 455/503 |
| 2006/0128424 A1* | 6/2006 | Rooyen | 455/552.1 |
| 2006/0209902 A1* | 9/2006 | Grilli et al. | 370/503 |

* cited by examiner

*Primary Examiner* — Duc C Ho
(74) *Attorney, Agent, or Firm* — Roylance, Abrams, Berdo and Goodman, LLP

(57) ABSTRACT

A system and method are provided for setting a point of time when information is applied in a mobile communication system. A broadcast overhead message including additional information is received and its application time-point is computed. The broadcast overhead message including the additional information is then applied at the computed time-point.

14 Claims, 10 Drawing Sheets

APPARATUS AND METHOD FOR ENCODING AND DECODING IN A MOBILE COMMUNICATION SYSTEM

CROSS-REFERENCE TO RELATED APPLICATION

This application claims the benefit under 35 U.S.C. §119 (a) of Korean Patent Application No. 10-2005-0018884 entitled "Method for Set up Applying Time of Overhead Message in Mobile Communication System" filed in the Korean Intellectual Property Office on Mar. 7, 2005, the entire disclosure of which is incorporated herein by reference.

BACKGROUND OF THE INVENTION

1. Field of the Invention

The present invention relates generally to an apparatus and method for encoding and decoding. More particularly, the present invention relates to an apparatus and method for setting a point of time when additional information is applied between transmitting/receiving terminals in a mobile communication system.

2. Description of the Related Art

In general, mobile communication systems have developed from voice service systems into systems that are capable of providing data services. These mobile communication systems can provide broadcast services as well as various data services. In the Third-Generation Partnership Project 2 (3GPP2), developments of various standardization tasks for broadcasting services based on Code Division Multiple Access (CDMA) are ongoing. According to CDMA2000 1× Revision D of the various standards proposed for broadcasting services in 3GPP2, a broadcasting service is called Broadcast and Multicast Service (BCMCS). In addition to the CDMA2000 1× Revision D standard, other standards for providing broadcast services are also being created. The applicable parts of the CDMA2000 1× Revision D standard are expressly incorporated herein by reference.

A broadcast service defined and used in the CDMA2000 1× Revision D standard will now be described. In the following description, the BCMCS service based on the CDMA2000 1× Revision D standard is referred to as the broadcast service.

The broadcast service is configured to transmit broadcast data in a block-interleaved frame unit through a channel on the basis of Time Division Multiplexing (TDM). This broadcast service can use an inner code such as a convolution code or turbo code, and an outer code such as a Reed-Solomon (RS) code serving as a well-known error correction code. When TDM is used to transmit the broadcast data, a receiving terminal selectively receives only minimum frames, thereby improving reception efficiency. To avoid a transmission error of successively generated broadcast data, an RS code is used. This RS code is defined in the present CDMA2000 1× Revision D standard.

Next, a method for transmitting broadcast data on the basis of a broadcast service standard will be described in greater detail.

FIG. 1 illustrates an example of time-division transmission based on the broadcast service standard.

As illustrated in FIG. 1, a base station transmits a broadcast service on the basis of TDM to provide the broadcast service. The TDM transmission methods as illustrated in FIG. 1 are divided on an interlace-by-interlace basis. For each interlace, multiplexes and burst lengths are allocated.

Each interlace indicates a slot of a physical channel transmitted in a time-slot unit in a 1× Evolution Data Only (1×EV-DO) system. In this case, the slot indicates an actual data transmission unit. The multiplex has an index for logically dividing the interlace. The burst length is used to indicate the number of repeat transmissions of a logical broadcast channel constructed by an interlace and multiplex method.

The elements A, B, C, D, and so forth of each interlace, indicate a type of service broadcast, that is, a logical channel, respectively. In FIG. 1, Interlace-0 100 comprises four multiplexing channels of A, B, C and D, Interlace-1 102 comprises four multiplexing channels of E, F, G and H, Interlace-2 104 comprises four multiplexing channels of A, K, L and M, and Interlace-3 106 comprises four multiplexing channels of O, P, Q and R.

In a length of each multiplexing channel included in Interlace-0 100, a value of BurstLength0[i] is set to i={0, 1, 2, 3}. A total burst length indicates a sum of burst lengths within each interlace.

However, various parameters for broadcast service transmission are transferred in a Broadcast Overhead Message (BOM). Specifically, additional information is included and transmitted in the BOM. At this time, the BOM is transferred in a broadcast overhead period. A BOM transmission period is defined by Equation (1) below.

$$BOM \text{ Transmission Period} = \text{Broadcast Overhead Period} \times 256 \text{ Slots} \quad (1)$$

In Equation (1), the broadcast overhead period is set to 7.

The CDMA2000 1× Revision D standard proposes a point of time when the BOM is transferred. However, a point of time when the BOM is actually transmitted and applied, that is, a change time-point, is not defined in the standard. Because the change time-point is not defined in the standard, there is a problem in that a system operates inefficiently in terms of capacity according to a time-point of applying the BOM.

A problem associated with a conventional method will now be described by way of example, wherein it is assumed that a point of time when a sum of burst lengths is ended, is set as a change time-point.

First, a maximum length of the sum of burst lengths within one interlace is 64×16=1024 slots. Accordingly, a maximum value of a time period of one interlace is 1024×4=4096. However, a period of a basic BOM is 7×256=1792 slots as shown in FIG. 2. FIG. 2 illustrates a conventional BOM transmission time. This makes a change time-point unclear. When a new BOM, that is, $BOM_B$, is first transferred at t=1 as shown in FIG. 3, for example, the $BOM_B$ is actually applied in a time $T_o$ according to a total burst length in a transmission and reception standard. FIG. 3 illustrates a conventional application time-point. During an interval of $1 \leq t \leq T_o$ in FIG. 3, additional information transferred through the BOM and additional information used for actual transmission and reception have different intervals. These different intervals result in the following problems.

When a receiver first receives the $BOM_B$ in a time of $t \geq 1$, there is a problem in that a determination cannot be made as to whether a BOM of a total burst length currently being received is a BOM used for actual transmission and reception because a determination cannot be made as to whether the $BOM_B$ matches a previously transmitted BOM.

There is another problem in that a relatively long waiting time is required for a service to be newly started when the total burst length is long.

Therefore, if channel information is changed when a broadcast service is started, an initial detection delay occurs because a user cannot know the change time-point.

Accordingly, a need exists for a system and method for effectively and efficiently defining and setting an application time-point.

SUMMARY OF THE INVENTION

It is, therefore, an object of embodiments of the present invention to substantially solve the above and other problems by providing an apparatus and method for defining an application time-point according to a change of additional information indicating a service position in a communication system for transmission based on Time Division Multiplexing (TDM).

It is another object of embodiments of the present invention to provide an apparatus and method that can detect an accurate channel change time-point in an environment in which a channel allocation is frequently varied.

It is yet another object of embodiments of the present invention to provide an apparatus and method that can efficiently operate in terms of capacity by defining a point of time when a Broadcast Overhead Message (BOM) is applied.

In accordance with an aspect of embodiments of the present invention, a method is provided for decoding in a mobile communication system for providing a broadcast/multicast service, comprising the steps of determining if a Broadcast Overhead Message (BOM) has been changed which corresponds to additional information comprising parameters for providing the broadcast/multicast service, and applying a new BOM received after a change application time-point if the BOM has been changed.

In accordance with another aspect of embodiments of the present invention, an apparatus is provided for decoding in a mobile communication system for providing a broadcast/multicast service, comprising a local channel selector for converting a broadcast/multicast signal received to provide the broadcast/multicast service to a plurality of logical channel symbols, an outer decoder for decoding the plurality of logical channel symbols output from the logical channel selector to a plurality of logical channel bits, and a controller for determining if a Broadcast Overhead Message (BOM) has been changed which corresponds to additional information comprising parameters for providing the broadcast/multicast service, and applying a new BOM received after a change application time-point if the BOM has been changed.

In accordance with another aspect of embodiments of the present invention, a method is provided for decoding in a mobile communication system for providing a broadcast/multicast service, comprising the steps of determining if a Broadcast Overhead Message (BOM) has been changed which corresponds to additional information comprising parameters for providing the broadcast/multicast service, and applying a new BOM from a first preamble position according to the new BOM received after a change application time-point if the BOM has been changed.

In accordance with yet another aspect of embodiments of the present invention, a method is provided for decoding in a mobile communication system for providing a broadcast/multicast service, comprising the steps of determining if a Broadcast Overhead Message (BOM) has been changed which corresponds to additional information comprising parameters for providing the broadcast/multicast service, and applying a new BOM from a position of a first burst transmitted in the new BOM received after a change application time-point if the BOM has been changed.

BRIEF DESCRIPTION OF THE DRAWINGS

The above and other objects and aspects of embodiments of the present invention will become more clearly understood from the following detailed description taken in conjunction with the accompanying drawings, in which.

Throughout the drawings, like reference numerals will be understood to refer to like parts, components and structures.

DETAILED DESCRIPTION OF THE EXEMPLARY EMBODIMENTS

In the following description, detailed descriptions of functions and configurations incorporated herein that are well known to those skilled in the art are omitted for clarity and conciseness. It is to be understood that the phraseology and terminology employed herein are for the purpose of describing the exemplary embodiments and should not be regarded as limiting the scope of the present invention.

Figure 4:
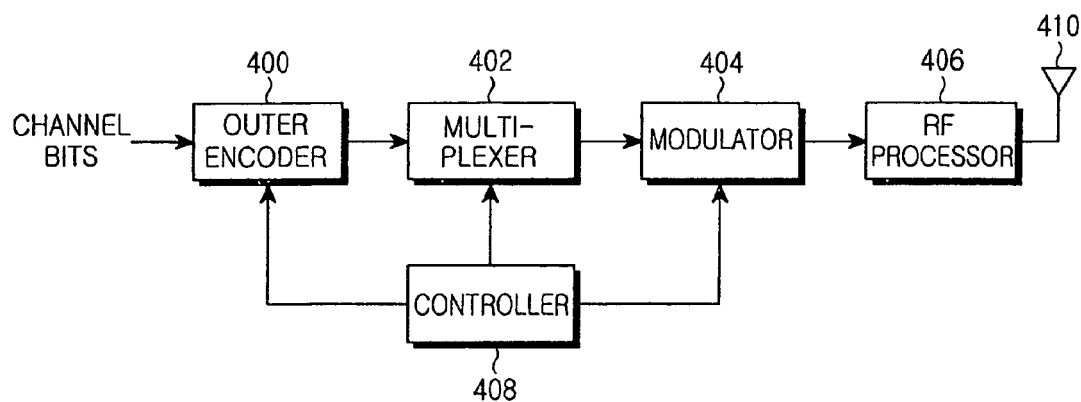
FIG. 4 is a block diagram illustrating an exemplary transmitting terminal for providing a broadcast service in accordance with an embodiment of the present invention.

FIG. 4 is a block diagram illustrating an exemplary transmitting terminal for providing a broadcast service in accordance with an embodiment of the present invention. An operation of the transmitting terminal for providing the broadcast service in accordance with an embodiment of the present invention will now be described with reference to FIG. 4.

The transmitting terminal of FIG. 4 comprises an outer encoder 400, a multiplexer 402, a modulator 404, a radio frequency (RF) processor 406, a controller 408, and an antenna 410. Referring to FIG. 4, the outer encoder 400 of the transmitting terminal receives logical channel bits for Reed-Solomon (RS) encoding. The outer encoder 400 encodes the received logical channel bits and outputs the encoded logical channel bits to the multiplexer 402. The multiplexer 402 multiplexes the encoded logical channel bits according to Time Division Multiplexing (TDM) and outputs the multiplexed logical channel bits to the modulator 404. The modulator 404 modulates TDM channel symbols and outputs the modulated channel symbols to the RF processor 406. The RF processor 406 up-converts the modulated channel symbols and transmits the up-converted channel symbols to a receiving terminal through the antenna 410.

The controller 408 controls the outer encoder 400, the multiplexer 402, and the modulator 404 in accordance with an embodiment of the present invention. The controller 408 controls the outer encoder 400 and the multiplexer 402, determines if a BOM has been changed which corresponds to additional information including parameters for providing a broadcast/multicast service, and controls an operation for transmitting a channel using a BOM newly received after a change time-point of the BOM. The controller 408 generates a BOM to be transmitted to a mobile terminal through the modulator 404 in order to notify the mobile terminal of a changed BOM.

Figure 5:
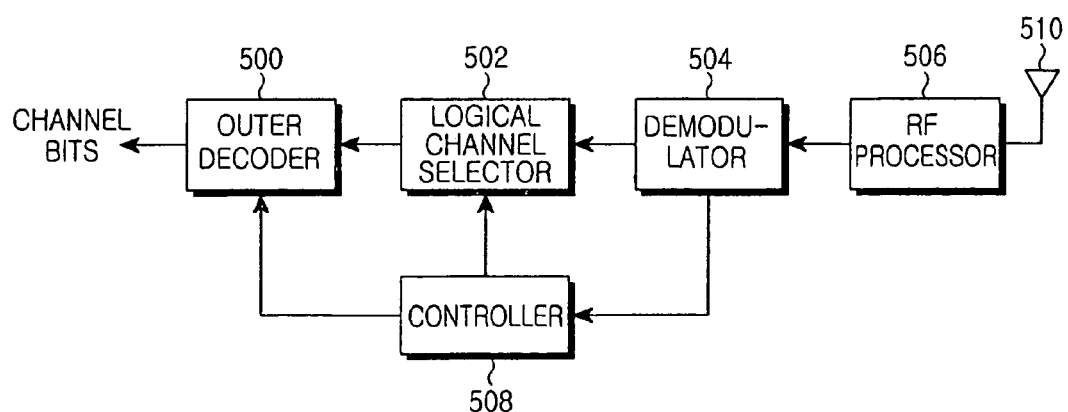
FIG. 5 is a block diagram illustrating an exemplary receiving terminal for providing a broadcast service in accordance with an embodiment of the present invention.

FIG. 5 is a block diagram illustrating an exemplary receiving terminal for providing a broadcast service in accordance with an embodiment of the present invention. An operation of the receiving terminal for providing the broadcast service in accordance with an embodiment of the present invention will now be described with reference to FIG. 5.

The receiving terminal of FIG. 5 comprises an outer encoder 500, a logical channel selector 502, a demodulator 504, a radio frequency (RF) processor 506, a controller 508, and an antenna 510. Referring to FIG. 5, the RF processor 506 of the receiving terminal down-converts a broadcast service signal received from the antenna 510 and outputs the down-converted signal to the demodulator 504. The demodulator 504 demodulates an input signal and outputs the demodulated signal to the logical channel selector 502. The logical channel selector 502 divides the demodulated signal into logical channels, and outputs the local channels to the outer decoder 500. The outer decoder 500 performs an RS decoding process for the logical channels.

Figure 6:
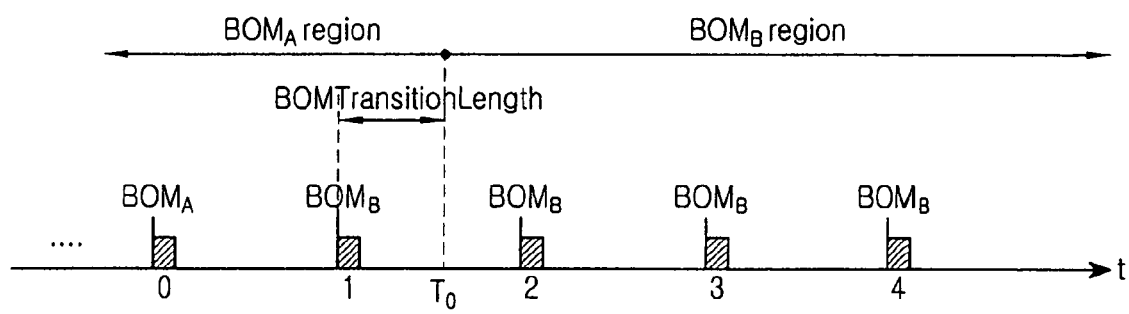
FIG. 6 illustrates an exemplary application time-point defined according to a change of additional information indicating a service position in a mobile communication system for transmission based on Time Division Multiplexing (TDM) in accordance with an embodiment of the present invention.

The controller 508 controls the outer decoder 500 and the logical channel selector 502 in accordance with an embodiment of the present invention. The controller 508 controls the outer decoder 500 and the logical channel selector 502, and determines if a Broadcast Overhead Message (BOM) has been changed which corresponds to additional information including parameters for providing a broadcast/multicast service. If the BOM has been changed, the controller 508 controls an operation for receiving a channel by applying a BOM newly received after a change time-point of the BOM. The controller 508 controls the outer decoder 500 to recover a message transmitted from a base station through the demodulator 504. FIG. 6 illustrates an exemplary application time-point defined according to a change of additional information indicating a service position in a mobile communication system for transmission based on TDM in accordance with an embodiment of the present invention.

Figure 1:
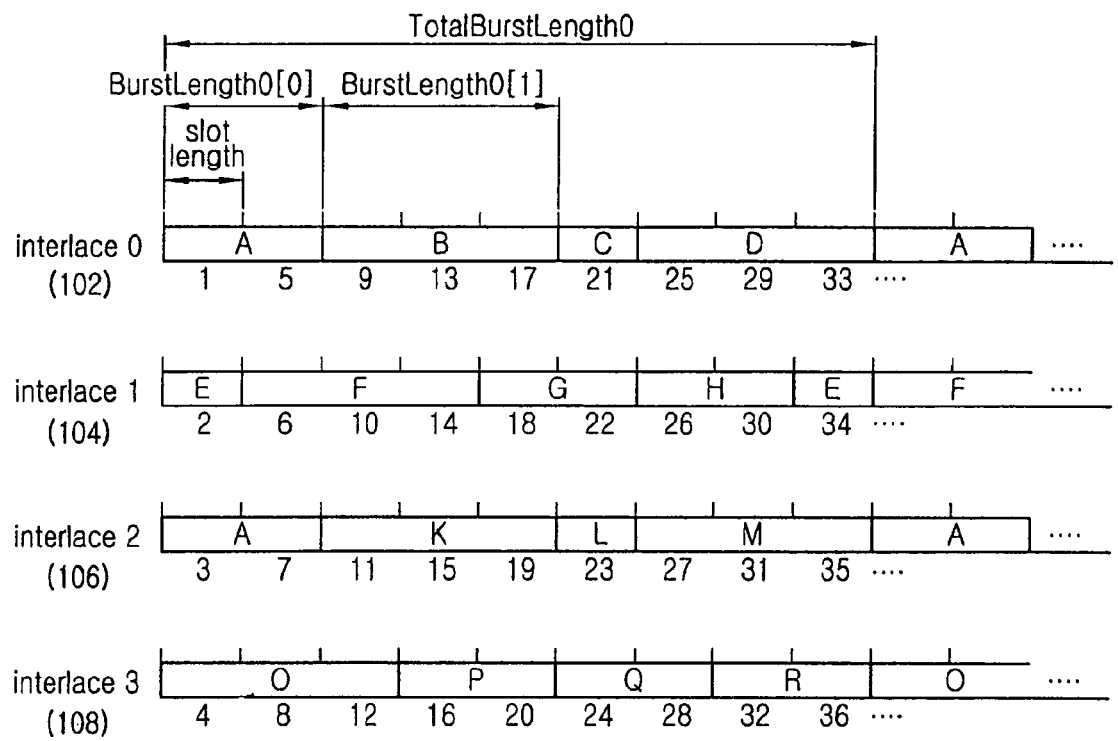
FIG. 1 illustrates an example of time-division transmission based on a broadcast service standard.
Figure 2:
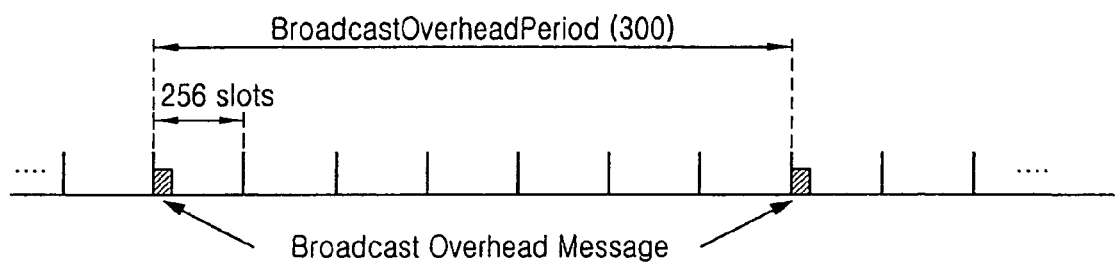
FIG. 2 illustrates a conventional Broadcast Overhead Message (BOM) transmission time.
Figure 3:
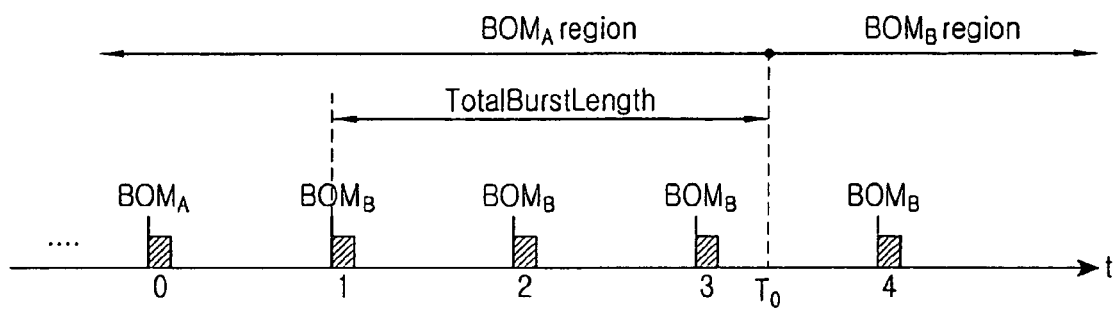
FIG. 3 illustrates a conventional BOM application time-point.

After a new BOM is transmitted as illustrated in FIG. 3, it is conventionally applied immediately after an end time-point of a first total burst length. In accordance with embodiments of the present invention, a BOM is transferred as illustrated in FIG. 6, and a new BOM is applied after a BOM transition length of a fixed time.

A description will now be provided of length conditions and a data application time-point after a BOM transition length without obscuring a change time-point and an application time-point of an accurate BOM transition length in accordance with an embodiment of the present invention.

A reference time $T_o$ of applying a new BOM is defined by Equation (2) below.

$$T_o = T_r + BOM \text{ Transition Length} \quad (2)$$

In Equation (2), $T_r$ indicates a reference time-point of applying a BOM transition length, that is, a time-point of applying a change of a new BOM.

A number of methods for an application time-point of a BOM transition length indicating a delay time are possible. Length conditions for avoiding obscurity will be described.

In a first method, $T_r$ is based on a message transfer period. The value $T_r$ is mapped to a position in which Equation (3) below, is satisfied.

$$T_r \bmod (256 \times \text{Broadcast Overhead Period}) = 0 \quad (3)$$

In Equation (3), Tr now indicates a first position of a slot period associated with (256×Broadcast Overhead Period). Thus, a condition of the BOM transition length for removing the obscurity of a change time-point is defined by Equation (4) below.

$$0 \leq BOM \text{ Transition Length} \leq 256 \times \text{Broadcast Overhead Period} \quad (4)$$

In a second method, $T_r$ is based on a message transfer start time-point.

The value $T_r$ is mapped to a position in which Equation (5) below, is satisfied.

$$(T_r - \text{Offset}) \bmod (256 \times \text{Broadcast Overhead Period}) = 0 \quad (5)$$

In Equation (5), $T_r$ now indicates a start time-point at which the BOM is transferred. Thus, a condition of the BOM transition length for removing the obscurity of a change time-point is defined by Equation (6) below.

$$0 \leq BOM \text{ Transition Length} \leq 256 \times \text{Broadcast Overhead Period} - \text{Offset} \quad (6)$$

In Equation (6), the offset comprises one value of the set $\{0, 1, 2, 3\}$.

FIGS. 7 to 12 illustrate an exemplary time-point for applying a BOM corresponding to additional information comprising parameters for providing a broadcast/multicast service in accordance with an embodiment of the present invention. The BOM application time-point in accordance with embodiments of the present invention will be described with reference to FIGS. 7 to 12. A description will be provided of a time-point of applying a new BOM after a BOM transition length on the basis of a method for applying the BOM in a regular time according to consideration of a start time-point of a burst length, a method for applying the BOM under consideration of a preamble, and a method for applying the BOM under consideration of a burst length.

Exemplary Method for Applying a BOM in a Regular Time

Figure 7:
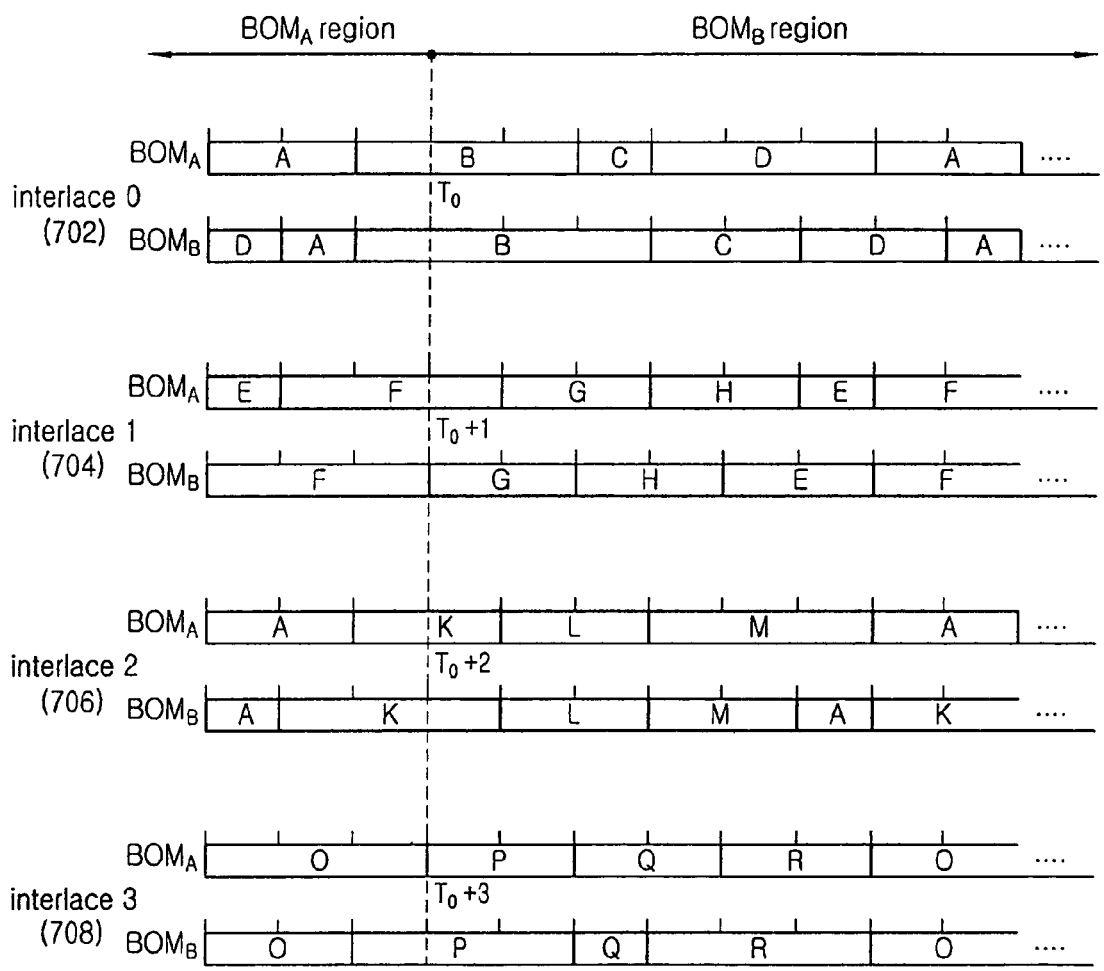
FIG. 7 illustrates an exemplary method for applying a BOM in a regular time according to consideration of a start time-point of a burst length in accordance with an embodiment of the present invention.

FIG. 7 illustrates an exemplary method for applying a BOM in a regular time according to consideration of a start time-point of a burst length in accordance with an embodiment of the present invention.

Referring to Interlace-0 702 of FIG. 7, a BOM is newly applied before and after a time $T_o$ regardless of data transmission content. That is, an existing $BOM_A$ is transmitted before the time $T_o$ and a $BOM_B$ is transmitted after the time $T_o$. Because $T_o$ is defined above in regard to Equation (2), further description here is omitted.

Referring to Interlace-1 704, a BOM is newly applied before and after a time $T_o+1$. That is, an existing $BOM_A$ is transmitted before the time $T_o+1$ and a $BOM_B$ is transmitted after the time $T_o+1$.

Referring to Interlace-2 706, a BOM is newly applied before and after a time $T_o+2$. That is, an existing $BOM_A$ is transmitted before the time $T_o+2$ and a $BOM_B$ is transmitted after the time $T_o+2$.

Referring to Interlace-3 708, a BOM is newly applied before and after a time $T_o+3$. That is, an existing $BOM_A$ is transmitted before the time $T_o+3$ and a $BOM_B$ is transmitted after the time $T_o+3$.

Figure 8:
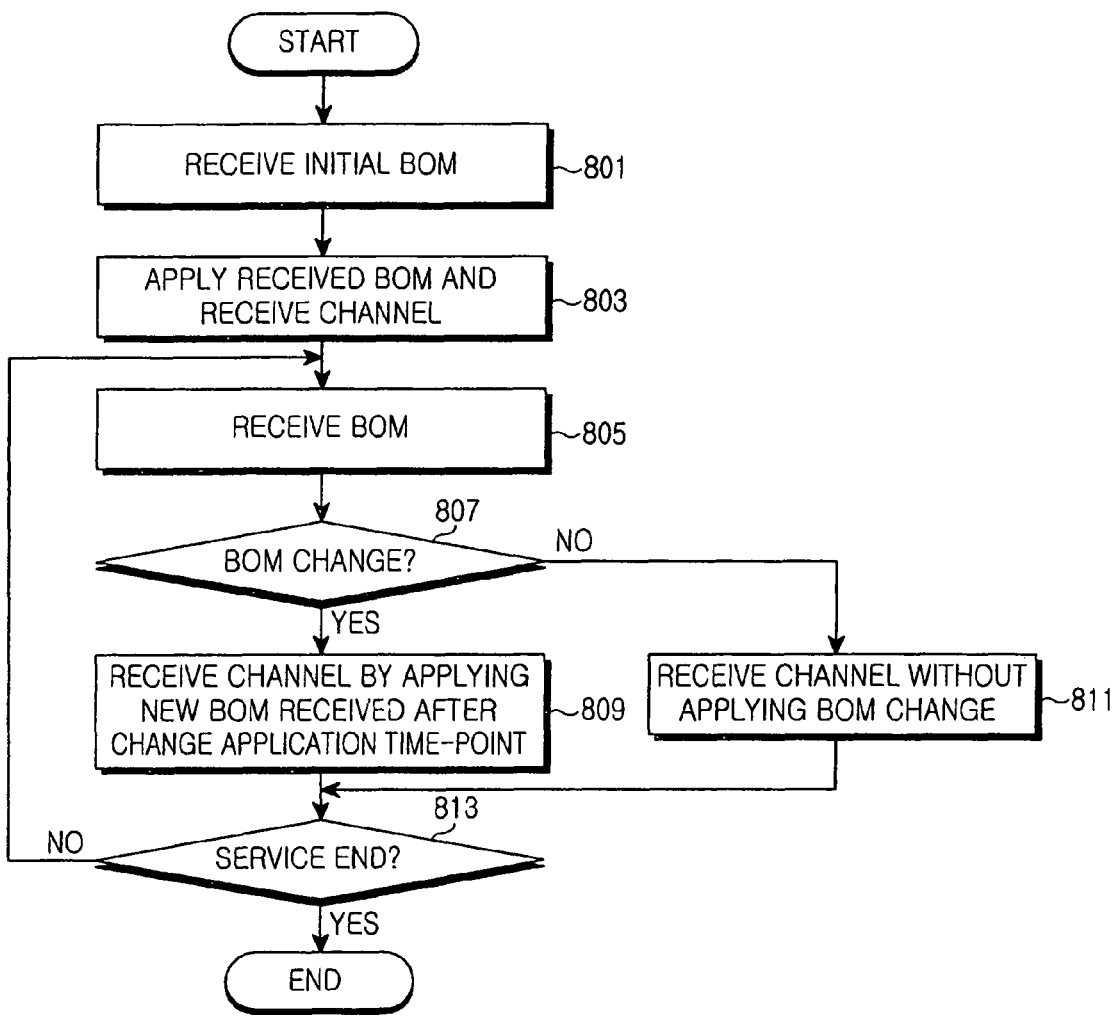
FIG. 8 is a flowchart illustrating an exemplary method for applying a BOM in a regular time in a mobile terminal in accordance with an embodiment of the present invention.

FIG. 8 is a flowchart illustrating an exemplary method for applying a BOM in a regular time in a mobile terminal in accordance with an embodiment of the present invention. Referring to FIGS. 5 and 8, the controller 508 of the mobile terminal receives an initial BOM in step 801. Then, the controller 508 of the mobile terminal applies the received BOM and receives a channel in step 803, and receives a BOM in step 805.

The controller 508 of the mobile terminal determines if the BOM has been changed in step 807. If the BOM has been changed, the controller 508 controls the outer decoder 500 to apply a new BOM received after a change application time-point as shown in Equation (2) above, and receive a channel in step 809. However, if the BOM has not been changed, the controller 508 receives the channel without changing the BOM in step 811.

After steps 809 and 811, the controller 508 of the mobile terminal determines if a service has been ended in step 813. If the service has not been ended, the controller 508 of the mobile terminal controls the outer decoder 500 to receive a BOM in step 805. Otherwise, the service is ended.

Because the above-described method has a regular BOM application time, it is advantageous in that the application method is very simple. Because the above-described method does not consider a burst length, it is disadvantageous in that preamble transmission of a first transmission packet after the time $T_o$ is not ensured when the packet is transmitted.

Exemplary Method for Applying a BOM Under Consideration of a Preamble

Figure 9:
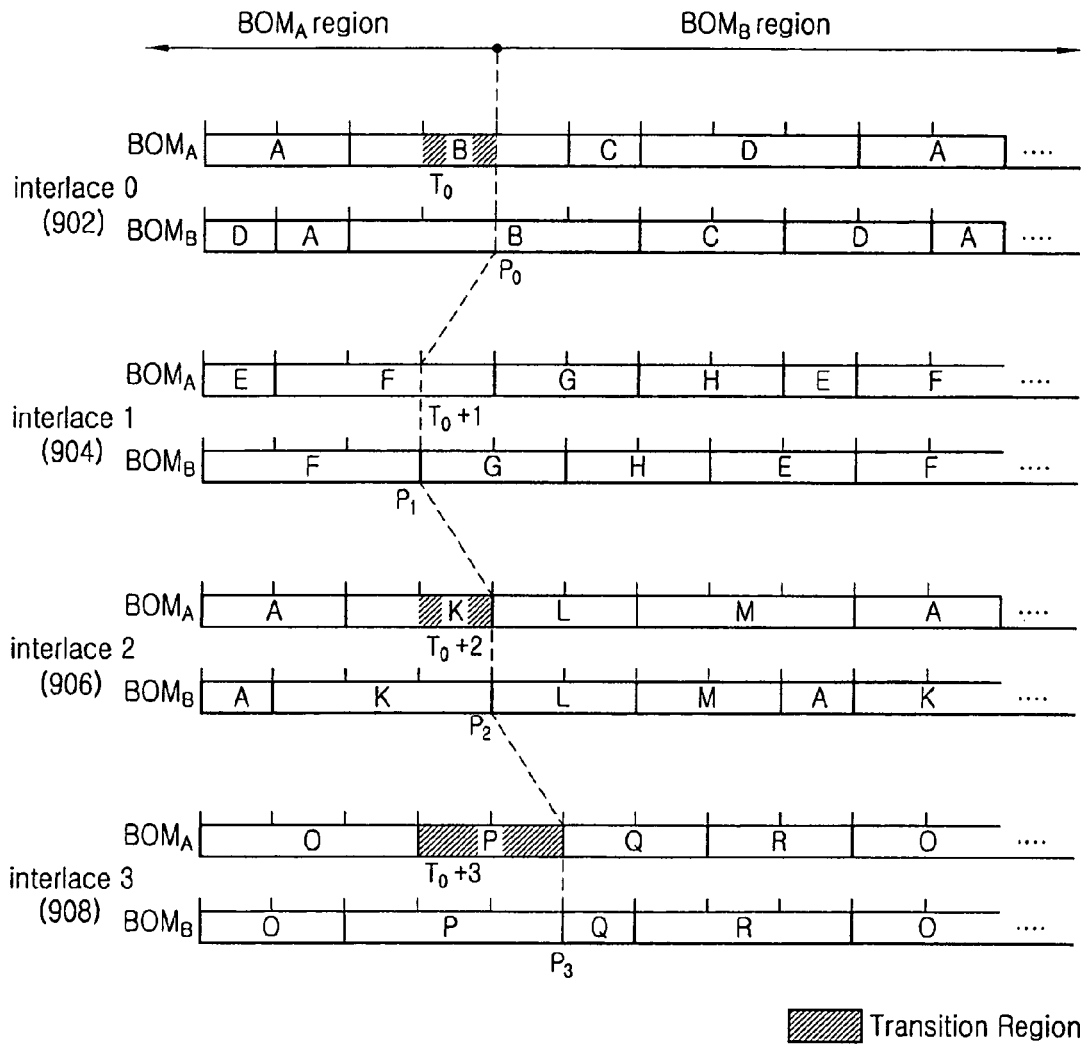
FIG. 9 illustrates an exemplary method for applying a BOM under consideration of a preamble in accordance with an embodiment of the present invention.

FIG. 9 illustrates an exemplary method for applying a BOM under consideration of a preamble in accordance with an embodiment of the present invention.

Referring to FIG. 9, it can be seen that a new BOM is applied in a position of a preamble (P) within a newly transmitted BOM. The P position is a position of a new packet to be first transmitted in the new BOM in a time equal to or more than $T_o$. That is, the P position is a slot position of a preamble that is capable of being first transmitted at a time equal to or more than $T_o$.

Referring to Interlace-0 902, a new BOM is applied in $P_o$ corresponding to a slot position to which a preamble closest to $T_o$ belongs and a position of a new packet to be first transmitted in a time equal to or more than $T_o$. That is, an existing $BOM_A$ is transmitted before the time $P_o$ and a $BOM_B$ is transmitted after the time $P_o$.

Referring to Interlace-1 904, a new BOM is applied in $P_1$ corresponding to a slot position to which a preamble closest to $T_o+1$ belongs and a position of a new packet to be first transmitted in a time $T_o+1$. That is, an existing $BOM_A$ is transmitted before the time $P_1$ and a $BOM_B$ is transmitted after the time $P_1$.

Referring to Interlace-2 906, a new BOM is applied in $P_2$ corresponding to a slot position to which a preamble closest to $T_o+2$ belongs and a position of a new packet to be first transmitted in a time equal to or more than $T_o+2$. That is, an existing $BOM_A$ is transmitted before the time $P_2$ and a $BOM_B$ is transmitted after the time $P_2$.

Referring to Interlace-3 908, a new BOM is applied in $P_3$ corresponding to a slot position to which a preamble closest to $T_o+3$ belongs and a position of a new packet to be first transmitted in a time equal to or more than $T_o+3$. That is, an existing $BOM_A$ is transmitted before the time $P_3$ and a $BOM_B$ is transmitted after the time $P_3$.

Figure 10:
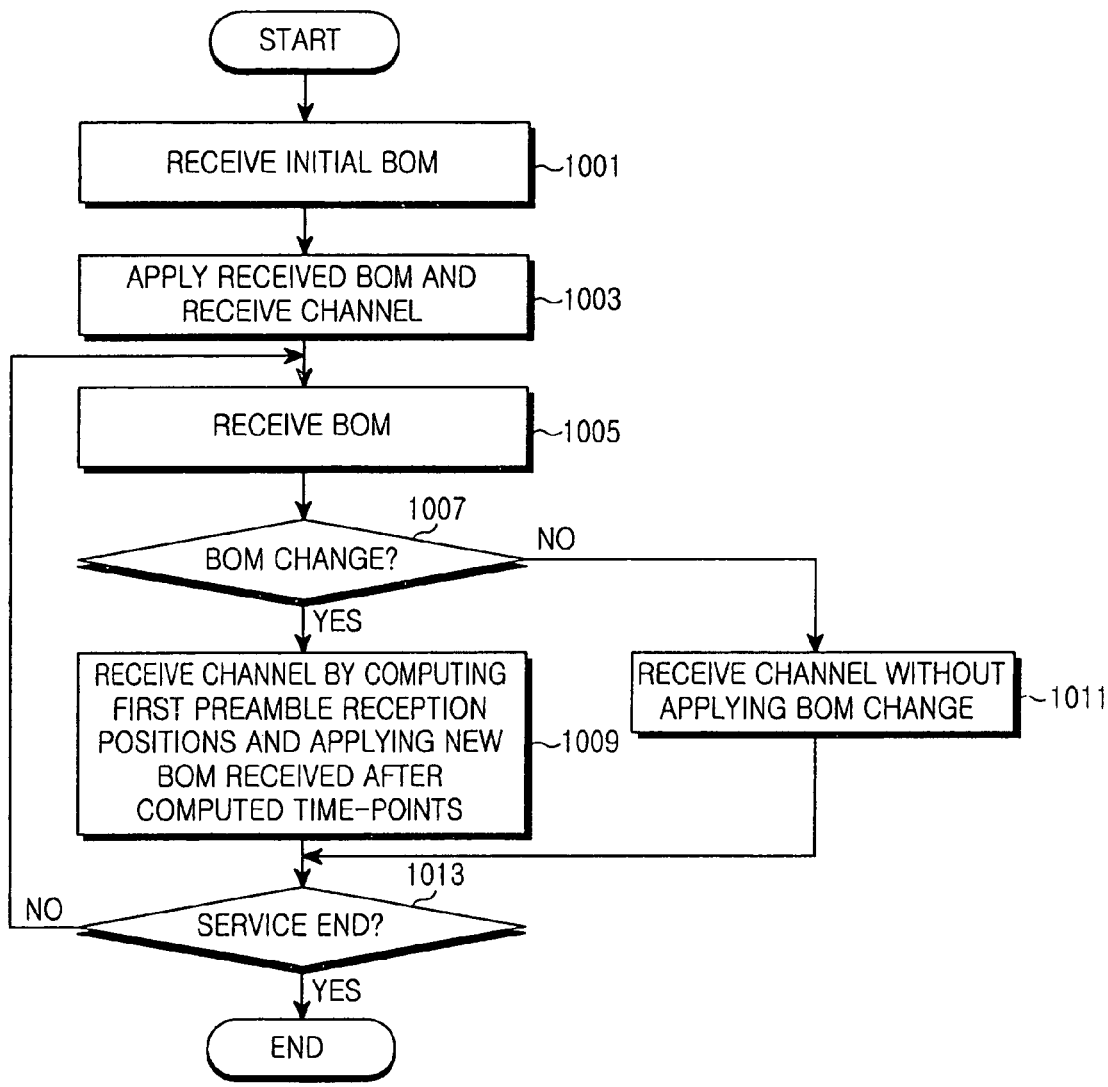
FIG. 10 is a flowchart illustrating an exemplary method for applying a BOM under consideration of a preamble in accordance with an embodiment of the present invention.

FIG. 10 is a flowchart illustrating an exemplary method for applying a BOM under consideration of a preamble in accordance with an embodiment of the present invention.

Referring to FIGS. 5 and 10, the controller 508 of the mobile terminal receives an initial BOM in step 1001. Then, the controller 508 of the mobile terminal applies the received BOM and receives a channel in step 1003, and receives a BOM in step 1005.

The controller 508 of the mobile terminal determines if the BOM has been changed in step 1007. If the BOM has been changed, the controller 508 controls the outer decoder 500 and proceeds to step 1009 to control an operation for computing first preamble reception positions based on a new BOM received after a change application time-point as shown in Equation (2) above, on an interlace-by-interlace basis, and applying the new BOM received after time-points computed on the interlace-by-interlace basis. However, if the BOM has not been changed, the controller 508 receives a channel without a BOM change in step 1011.

After steps 1009 and 1011, the controller 508 of the mobile terminal determines if a service has been ended in step 1013. If the service has not been ended, the controller 508 of the mobile terminal controls the outer decoder 500 to receive the BOM in step 1005. Otherwise, the service is ended.

The method for applying the BOM under consideration of the preamble can solve a non-transmission problem of the preamble occurring in the method for applying the BOM in the regular time. However, because the P position is computed in an interlace unit, start positions may be different on the interlace-by-interlace basis as illustrated in FIG. 9. The hatched region shown in FIG. 9 represents a transition region. Data based on a previous BOM can be continuously transmitted in the transition region.

Exemplary Method for Applying a BOM Under Consideration of a Burst Length

Figure 11:
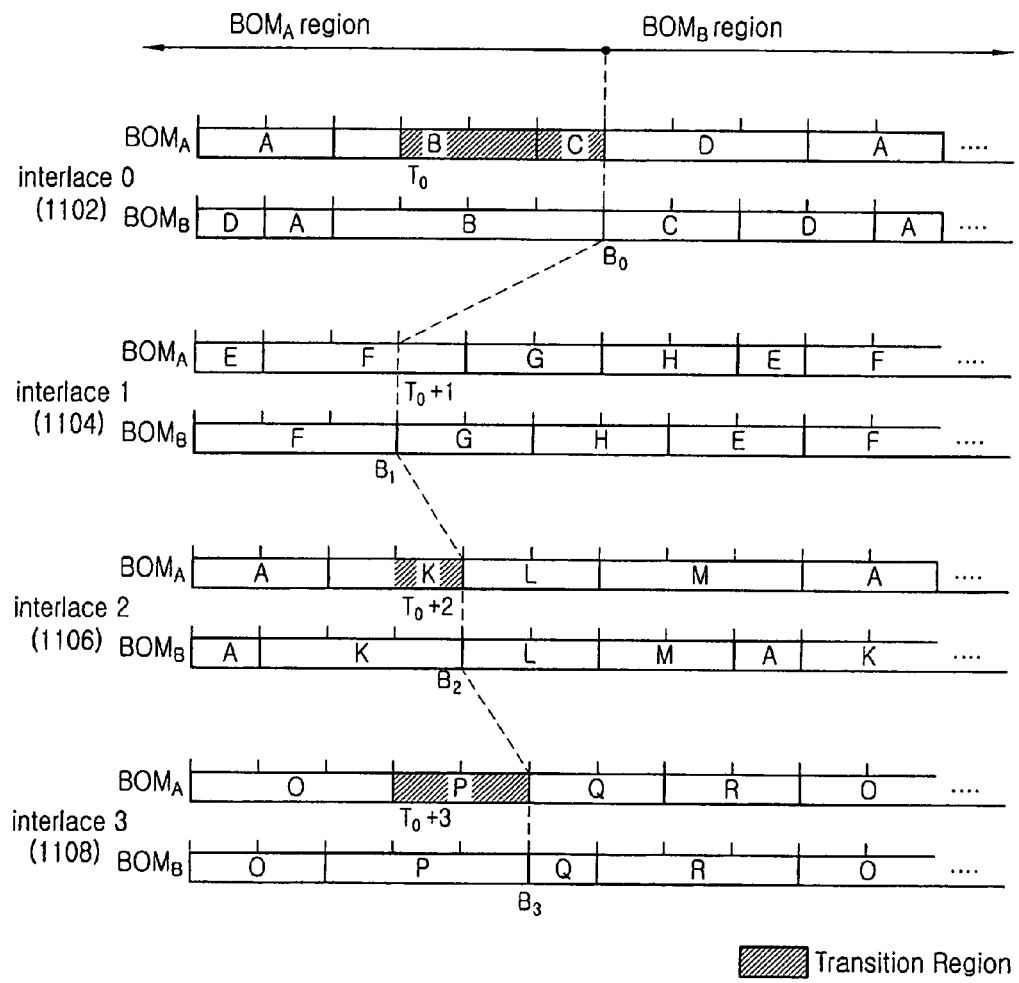
FIG. 11 illustrates an exemplary method for applying a BOM under consideration of a burst length in accordance with another embodiment of the present invention.

FIG. 11 illustrates an exemplary method for applying a BOM under consideration of a burst length in accordance with another embodiment of the present invention. Referring to FIG. 11, the method for applying the BOM under consideration of a burst length ensures a burst length of a first transmission packet after the BOM is changed. The above-described method can simply perform a start position computation process as compared with the method for applying a BOM under consideration of the preamble.

As illustrated in FIG. 11, the method for applying a BOM under consideration of a burst length applies a new BOM in a position of B (BurstLength). The B position is a start position of a length of a new burst to be first transmitted in a time equal to or more than $T_o$ according to the new BOM. Like the method for applying the BOM under consideration of the preamble, the method for applying the BOM under consideration of the burst length computes the B position in an interlace unit.

Referring to Interlace-0 1102, a new BOM is applied in $P_o$ corresponding to a slot position to which a burst closest to $T_o$ belongs and a start position of a new burst to be first transmitted in a time equal to or more than $T_o$ according to the new BOM. That is, an existing $BOM_A$ is transmitted before the time $B_o$ and a $BOM_B$ is transmitted after the time $B_o$.

Referring to Interlace-1 1104, a new BOM is applied in $B_1$ corresponding to a slot position to which a burst closest to $T_o+1$ belongs and a start position of a new burst to be first transmitted in a time $T_o+1$ according to the new BOM. That is, an existing $BOM_A$ is transmitted before the time $B_1$ and a $BOM_B$ is transmitted after the time $B_1$.

Referring to Interlace-2 1106, a new BOM is applied in $P_2$ corresponding to a slot position to which a burst closest to $T_o+2$ belongs and a position of a new burst to be first transmitted in a time equal to or more than $T_o+2$. That is, an existing $BOM_A$ is transmitted before the time $B_2$ and a $BOM_B$ is transmitted after the time $B_2$.

Referring to Interlace-3 1108, a new BOM is applied in $P_3$ corresponding to a slot position to which a burst closest to $T_o+3$ belongs and a position of a new burst to be first transmitted in a time equal to or more than $T_o+3$. That is, an existing $BOM_A$ is transmitted before the time $B_3$ and a $BOM_B$ is transmitted after the time $B_3$.

Figure 12:
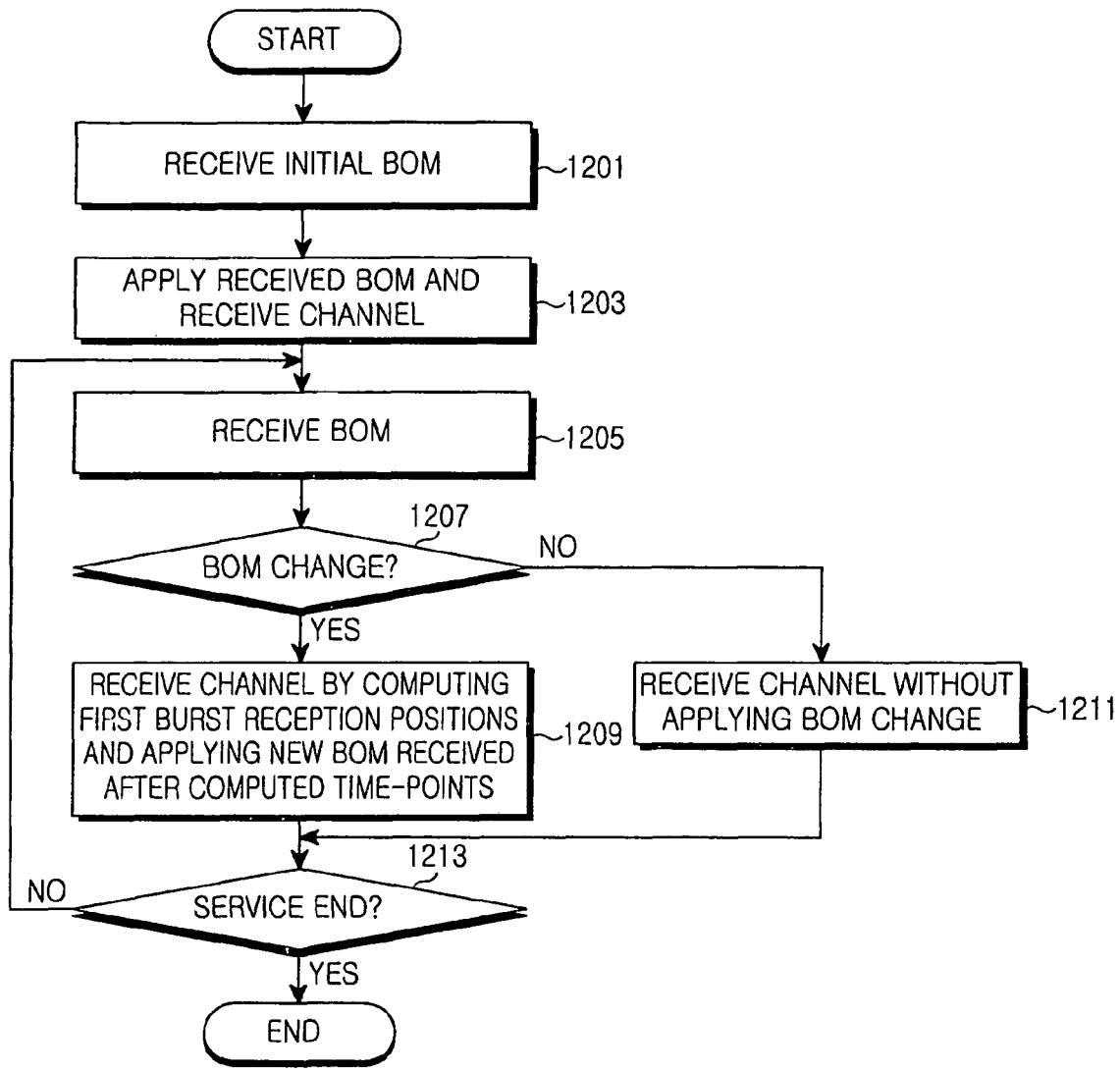
FIG. 12 is a flowchart illustrating an exemplary method for applying a BOM under consideration of a burst length in accordance with another embodiment of the present invention.

FIG. 12 is a flowchart illustrating an exemplary method for applying a BOM under consideration of a burst length in accordance with another embodiment of the present invention.

Referring to FIGS. 5 and 12, the controller 508 of the mobile terminal receives an initial BOM in step 1201. Then, the controller 508 of the mobile terminal applies the received BOM and receives a channel in step 1203, and receives a BOM in step 1205.

The controller 508 of the mobile terminal determines if the BOM has been changed in step 1207. If the BOM has been changed, the controller 508 controls the outer decoder 500 to control an operation for computing first burst reception positions based on a new BOM received after a change application time-point as shown in Equation (2) above, on an interlace-by-interlace basis, and applying the new BOM received after time-points computed on the interlace-by-interlace basis in step 1209. However, if the BOM has not been changed, the controller 508 receives a channel without a BOM change in step 1211.

After steps 1209 and 1211, the controller 508 of the mobile terminal determines if a service has been ended in step 1213. If the service has not been ended, the controller 508 of the mobile terminal controls the outer decoder 500 to receive the BOM in step 1205. Otherwise, the service is ended.

Like the method for applying the BOM under consideration of the preamble, the method for applying the BOM under consideration of the burst length can have different start positions on an interlace-by-interlace basis. It can be seen that data based on a previous BOM is continuously transmitted in a transition region because the transition region corresponding to the hatched region of FIG. 11 is a region before a new burst is started.

The method for applying the BOM under consideration of the burst length can ensure a burst length of a first transmission packet after a BOM change, and can simply compute a start position as compared with the method for applying the BOM under consideration of the preamble.

As is apparent from the above description, embodiments of the present invention can have the following and other beneficial effects.

Embodiments of the present invention can simply implement an application method because a BOM application time is regular by applying a BOM at an application time-point due to a change of additional information indicating a service position according to a regular time in a mobile communication system based on TDM.

Further, embodiments of the present invention can solve a non-transmission problem of a preamble by applying a BOM under consideration of the preamble at an application time-point due to a change of additional information indicating a service position in a mobile communication system based on TDM.

Further, embodiments of the present invention can simply compute a start position by applying a BOM under consideration of a burst length at an application time-point due to a change of additional information indicating a service position in a mobile communication system based on TDM.

Still further, embodiments of the present invention can minimize the information loss due to an unclear channel change time-point determined by a user in an environment in which a channel allocation is frequently varied by using an application time-point due to a change of additional information indicating a service position in a mobile communication system based on TDM.

Although a number of exemplary embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A method for decoding in a mobile communication system for providing a broadcast/multicast service, comprising the steps of:
   controlling a controller in communication with a logical channel selector and an outer decoder for determining if a Broadcast Overhead Message (BOM) has been changed which corresponds to information comprising parameters for providing the broadcast/multicast service; and
   controlling the outer decoder for applying a new BOM received after a change application time-point if the BOM has been changed.

2. The method of claim 1, further comprising the step of determining the change application time-point that is subsequent to a predetermined time defined by the following equation:

$$T_o = T_r + \text{BOM Transition Length},$$

wherein $T_o$ comprises the predetermined time and $T_r$ comprises a reference time-point of applying the BOM transition length.

3. The method of claim 1, further comprising the step of:
   receiving a channel without applying the BOM if the BOM has not been changed.

4. An apparatus for decoding in a mobile communication system for providing a broadcast/multicast service, comprising:
   a logical channel selector for converting a broadcast/multicast signal received to provide the broadcast/multicast service to a plurality of logical channel symbols;
   an outer decoder for decoding the plurality of logical channel symbols output from the logical channel selector to a plurality of logical channel bits; and
   a controller in communication with the logical channel selector and the outer decoder, for determining if a Broadcast Overhead Message (BOM) has been changed which corresponds to information comprising parameters for providing the broadcast/multicast service, and controlling the outer decoder for applying a new BOM received after a change application time-point if the BOM has been changed.

5. The apparatus of claim 4, wherein the controller is configured to determine the change application time-point that is subsequent to a predetermined time defined by the following equation:

$$T_o=T_r+\text{BOM Transition Length},$$

wherein $T_o$ comprises the predetermined time and $T_r$ comprises a reference time-point of applying the BOM transition length.

6. The apparatus of claim 4, wherein the controller is configured to control an operation for receiving a channel without applying the BOM if the BOM has not been changed.

7. The apparatus of claim 4, wherein the controller is configured to:
compute first preamble reception positions on an interlace-by-interlace basis according to the new BOM received after the change application time-point if the BOM has been changed; and
apply the new BOM received after time-points computed on the interlace-by-interlace basis.

8. The apparatus of claim 4, wherein the controller is configured to:
compute first burst reception positions on an interlace-by-interlace basis according to the new BOM received after the change application time-point if the BOM has been changed; and
apply the new BOM received after time-points computed on the interlace-by-interlace basis.

9. A method for decoding in a mobile communication system for providing a broadcast/multicast service, comprising the steps of:
controlling a controller in communication with a logical channel selector and an outer decoder for determining if a Broadcast Overhead Message (BOM) has been changed which corresponds to information comprising parameters for providing the broadcast/multicast service; and
controlling the outer decoder for applying a new BOM from a first preamble position according to the new BOM received after a change application time-point if the BOM has been changed.

10. The method of claim 9, further comprising the steps of:
computing first preamble reception positions on an interlace-by-interlace basis according to the new BOM received after the change application time-point if the BOM has been changed; and
applying the new BOM received after time-points computed on the interlace-by-interlace basis.

11. The method of claim 9, further comprising the step of determining the change application time-point that is subsequent to a predetermined time defined by the following equation:

$$T_o=T_r+\text{BOM Transition Length},$$

wherein $T_o$ comprises the predetermined time and $T_r$ comprises a reference time-point of applying the BOM transition length.

12. A method for decoding in a mobile communication system for providing a broadcast/multicast service, comprising the steps of:
controlling a controller in communication with a logical channel selector and an outer decoder for determining if a Broadcast Overhead Message (BOM) has been changed which corresponds to information comprising parameters for providing the broadcast/multicast service; and
controlling the outer decoder for applying a new BOM from a position of a first burst transmitted in the new BOM received after a change application time-point if the BOM has been changed.

13. The method of claim 12, further comprising the steps of:
computing first burst reception positions on an interlace-by-interlace basis according to the new BOM received after the change application time-point if the BOM has been changed; and
applying the new BOM received after time-points computed on the interlace-by-interlace basis.

14. The method of claim 12, further comprising the step of determining the change application time-point that is subsequent to a predetermined time defined by the following equation:

$$T_o=T_r+\text{BOM Transition Length},$$

wherein $T_o$ comprises the predetermined time and $T_r$ comprises a reference time-point of applying the BOM transition length.

* * * * *